United States Patent
Chhibber et al.

(10) Patent No.: US 9,542,595 B2
(45) Date of Patent: Jan. 10, 2017

(54) SYSTEMS AND METHODS FOR RECOMMENDING COSMETIC PRODUCTS FOR USERS WITH MOBILE DEVICES

(71) Applicant: BrighTex Bio-Photonics LLC, San Jose, CA (US)

(72) Inventors: Rajeshwar Chhibber, San Jose, CA (US); Ashutosh Chhibber, San Jose, CA (US); Shefali Sharma, Petaluma, CA (US)

(73) Assignee: BrighTex Bio-Photonics LLC, San Jose, CA (US)

( * ) Notice: Subject to any disclaimer, the term of this patent is extended or adjusted under 35 U.S.C. 154(b) by 24 days.

(21) Appl. No.: 14/224,659

(22) Filed: Mar. 25, 2014

(65) Prior Publication Data

US 2014/0314315 A1    Oct. 23, 2014

Related U.S. Application Data

(60) Provisional application No. 61/805,126, filed on Mar. 25, 2013.

(51) Int. Cl.
*G06K 9/00* (2006.01)
*A45D 44/00* (2006.01)

(52) U.S. Cl.
CPC ......... *G06K 9/00234* (2013.01); *A45D 44/005* (2013.01); *A45D 2044/007* (2013.01)

(58) Field of Classification Search
CPC ............ A45D 2044/007; A45D 44/005; G06K 9/00221; G06K 9/00234; G06K 9/00
USPC ........................................................ 382/165
See application file for complete search history.

(56) References Cited

U.S. PATENT DOCUMENTS

| | | | | |
|---|---|---|---|---|
| 7,336,810 B2* | 2/2008 | Fujii | ............... | A61B 5/0059 356/369 |
| 7,577,310 B2* | 8/2009 | Kinjo | ............... | G06K 9/00308 382/118 |
| 8,693,768 B1* | 4/2014 | LaForgia | ............... | A45D 44/005 222/1 |
| 2008/0219528 A1* | 9/2008 | Edgar | ............... | A45D 44/005 382/128 |
| 2010/0284610 A1* | 11/2010 | Yoshikawa | ............... | G06T 7/0012 382/164 |
| 2012/0223956 A1* | 9/2012 | Saito | ............... | A45D 44/005 345/582 |

* cited by examiner

*Primary Examiner* — Ali Bayat
(74) *Attorney, Agent, or Firm* — Kelley Drye & Warren LLP

(57) ABSTRACT

An electronic device for analyzing a skin of a subject and identifying a cosmetic product for the subject includes one or more processors and memory storing one or more programs for execution by the one or more processors. The device transfers a digital image of at least a portion of a face of the subject. The digital image includes a plurality of pixels. Skin pixels in the plurality of pixels are identified. Color space values are identified from the skin pixels. A cosmetic product is identified at least based on the color space values. The device transfers information of the cosmetic product.

15 Claims, 8 Drawing Sheets

SYSTEMS AND METHODS FOR RECOMMENDING COSMETIC PRODUCTS FOR USERS WITH MOBILE DEVICES

RELATED APPLICATIONS

This application claims priority to U.S. Provisional Patent Application Ser. No. 61/805,126, filed Mar. 25, 2013, entitled "Systems and Methods for Recommending Cosmetic Products for Users with Mobile Devices," which is incorporated by reference herein in its entirety.

This application is related to U.S. patent application Ser. No. 13/240,969, filed Sep. 22, 2011, entitled "Systems and Methods for Determining a Surface Profile Using a Plurality of Light Sources" and U.S. patent application Ser. No. 13/078,834, filed Apr. 1, 2011, entitled "Methods and Systems for Imaging and Modeling Skin Using Polarized Lighting," which claims priority to U.S. Provisional Application Ser. No. 61/320,627, filed Apr. 2, 2010, entitled "Methods and Systems for Imaging and Modeling Skin Using Polarized Lighting," and is a continuation-in-part of U.S. patent application Ser. No. 12/731,072, filed Mar. 24, 2010, entitled "Methods and Systems for Imaging Skin Using Polarized Lighting," which claims priority to U.S. Provisional Application Ser. No. 61/164,356, filed Mar. 27, 2009, entitled "Methods and Systems for Imaging Skin Using Polarized Lighting." All of these applications are incorporated by reference herein in their entirety.

TECHNICAL FIELD

The disclosed embodiments relate generally to imaging skin, and more particularly, to determining a color of skin and recommending a cosmetic product.

BACKGROUND

Selection of cosmetic products for a user typically involves many trials with different products. It often takes time and efforts to find a cosmetic product that works well for the user, which can be frustrating and cumbersome. Furthermore, a cosmetic product that has been selected solely based on a visual perception of the user may not be a correct cosmetic product for the user.

SUMMARY

Accordingly, there is a need for systems that can identify a cosmetic product for a user. The above deficiencies and other related problems are addressed by the systems and methods described herein. In some embodiments, a method includes transferring a digital image of at least a portion of a face of the subject, the digital image including a plurality of pixels. Skin pixels in the plurality of pixels are identified, color space values are identified from the skin pixels, and a cosmetic product is identified at least based on the color space values. The method also includes transferring information of the cosmetic product.

In some embodiments, an electronic device includes one or more processors; and memory storing one or more programs for execution by the one or more processors. The one or more programs including instructions for transferring a digital image of at least a portion of a face of the subject, the digital image including a plurality of pixels. Skin pixels in the plurality of pixels are identified, color space values are identified from the skin pixels, and a cosmetic product is identified at least based on the color space values. The one or more programs also include instructions for transferring information of the cosmetic product.

In some embodiments, a non-transitory computer readable storage medium stores one or more programs for execution by one or more processors of an electronic device. The one or more programs include instructions for transferring a digital image of at least a portion of a face of the subject, the digital image including a plurality of pixels. Skin pixels in the plurality of pixels are identified, color space values are identified from the skin pixels, and a cosmetic product is identified at least based on the color space values. The one or more programs also include instructions for transferring information of the cosmetic product.

Thus, systems for identifying a cosmetic product based on an image of a user are provided, thereby increasing the speed, quality, accuracy, and details of identifying a cosmetic product for the user.

BRIEF DESCRIPTION OF THE DRAWINGS

For a better understanding of the aforementioned embodiments, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments. In addition, it should be noted that at least some of the drawings are not drawn to scale.

It will also be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention. The first image and the second image are both images, but they are not the same image.

Figure 1:
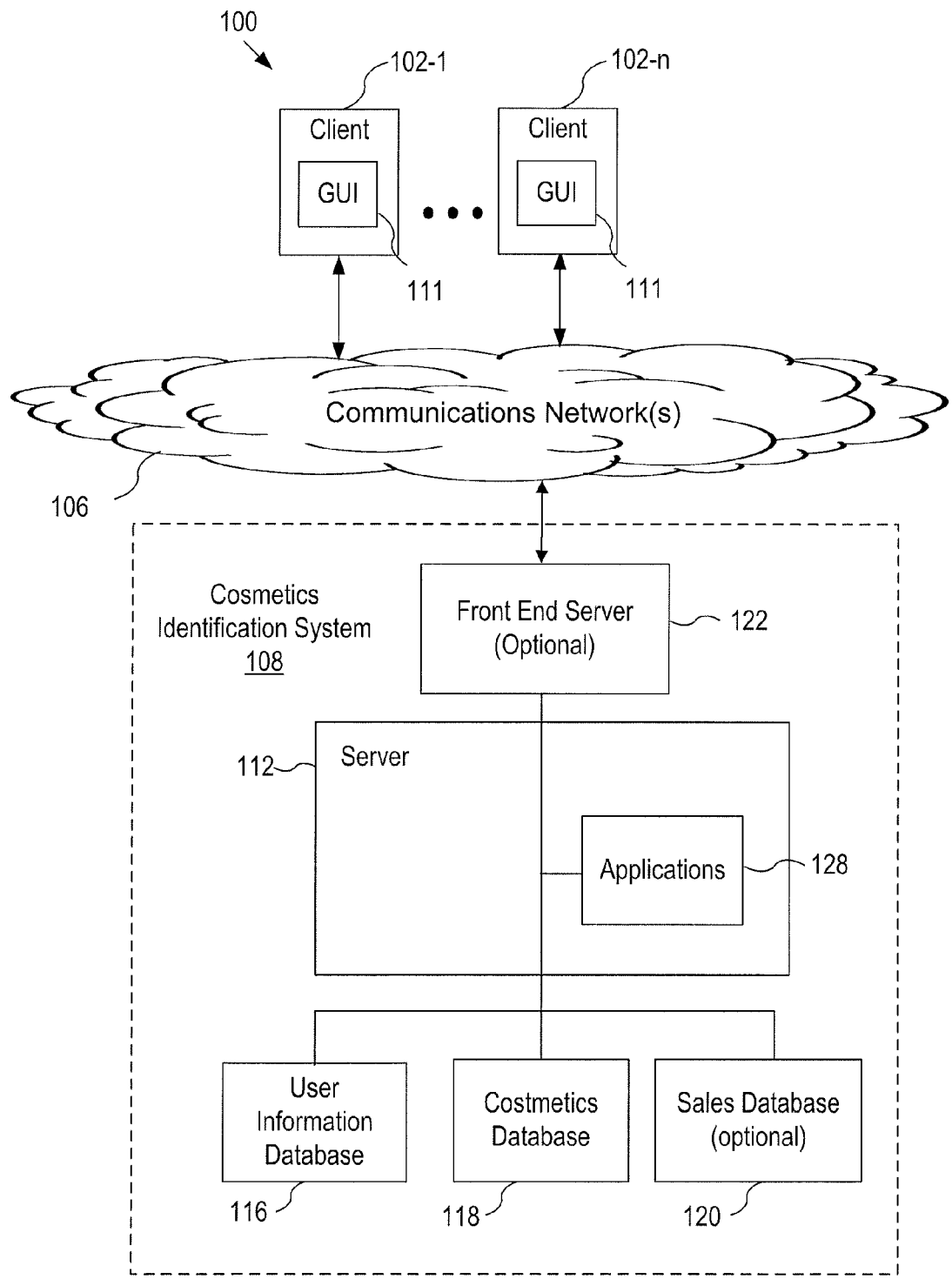
FIG. 1 is a block diagram illustrating an exemplary distributed computer system in accordance with some embodiments.

FIG. 1 is a block diagram illustrating an exemplary distributed computer system 100, according to certain embodiments. In FIG. 1, system 100 includes one or more client device 102, communications network(s) 106, and cosmetics identification system 108. Various embodiments of the cosmetics identification system 108 implement the cosmetics identification methods described in this document.

Client device 102 can be any of a number of electronic devices (e.g., Internet kiosk, personal digital assistant, cell phone, gaming device, desktop computer, laptop computer, handheld computer, or combinations thereof) used to enable the activities described below. Client device(s) 102 is also referred to herein as client(s). Client 102 includes a graphical user interface (GUI) 111. Client 102 is described in greater detail below with reference to FIG. 3. Client 102 is connected to cosmetics identification system 108 via communications network(s) 106. As described in more detail below, GUI 111 is used to display information of cosmetic products. Cosmetics identification system 108 provides cosmetics identification services to a plurality of users who access cosmetics identification system 108 from clients 102.

Cosmetics identification system 108 includes one or more servers, such as server 112, connected to communications network(s) 106. Optionally, the one or more servers are connected to communications network(s) 106 via front end server 122 (e.g., a server that conveys (and optionally parses) inbound requests to the appropriate server of system 108, and that formats responses and/or other information being sent to clients in response to requests). Front end server 122, if present, may be a web server providing web based access to cosmetics identification system 108. Front end server 122, if present, may also route communications to and from other destinations, such as an online transaction server (e.g., a server for merchandise sales).

Cosmetics identification system 108 includes user information database 116, cosmetics database 118, and optionally, sales database 120. In some embodiments, cosmetics identification system 108 also includes or has access to one or more other databases, such as image database (not shown). In some embodiments, the image database is a cloud database. Server 112 includes applications 128. Server 112 communicates with databases internal to cosmetics identification system 108, such as user information database 116, cosmetics database 118, and optionally, sales database 120, and in some embodiments, an image database (not shown) using a local area network, by internal communication busses, or by any other appropriate mechanism or combination of mechanism.

Server 112 communicates with clients 102 via front end server 122 (if present) and communication network(s) 106. In some embodiments, communications network(s) 106 is the Internet. In other embodiments, communication network(s) 106 can be any local area network (LAN), wide area network (WAN), metropolitan area network, or a combination of such networks. In some embodiments, if server 112 is used within an intranet, it may be an intranet server.

Applications 128 include application programs used for managing an online cosmetics identification system. In some embodiments, applications 128 also include a user information processing module, where the user information processing module assists in accessing and updating user information database 116. User information database 116 stores various information associated with the users of cosmetics identification system 108, including user preferences, digital images, and optionally other information such as user survey results. In some other embodiments, sales database 120 stores purchase history of users.

In some embodiments, cosmetics database 118 stores information concerning various cosmetic products (e.g., name, price, type, and color). The details of cosmetics data stored in cosmetics database 118 is described in detail with respect to FIG. 4A.

In some embodiments, user information database 116 includes user information records having information relevant to the identification of cosmetic products. For example, the user information record for a respective user may include, in addition to identifying information for the user, user preferences (e.g., preferred finish of a cosmetic product, color perception of the user, etc.).

In essence, server 112 is configured to manage certain aspects of cosmetics identification system 108, including transferring information of a cosmetic product to a respective client 102.

Optionally, cosmetics identification system 108 is implemented as part of an online cosmetics store system that provides cosmetics sales services to users.

In some embodiments, fewer and/or additional modules, functions or databases are included in cosmetics identification system 108 and server 112. The modules shown in cosmetics identification system 108 and server 112 represent functions performed in certain embodiments.

Figure 2:
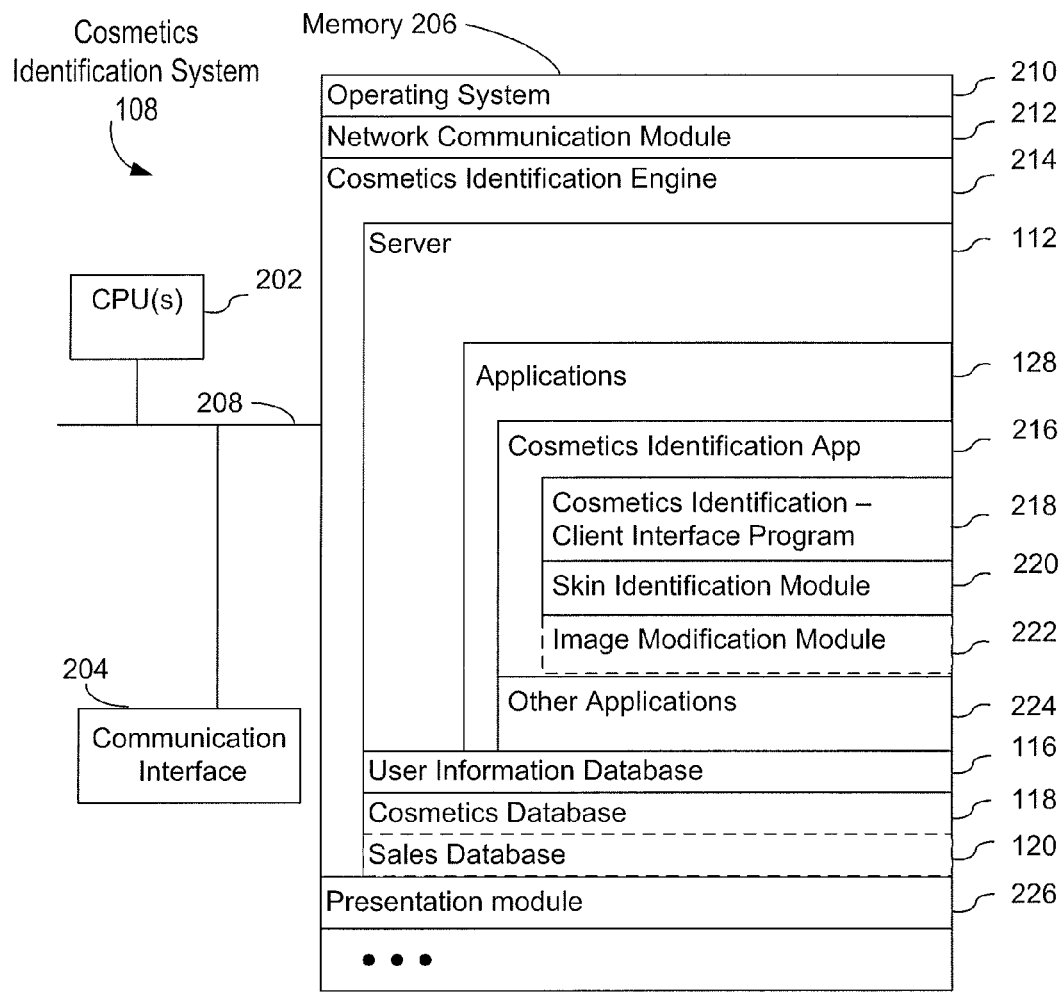
FIG. 2 is a block diagram illustrating a cosmetics identification system in accordance with some embodiments.

FIG. 2 is a block diagram illustrating cosmetics identification system 108 in accordance with some embodiments. Cosmetics identification system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, cosmetics identification system 108 includes a user interface (not shown) (e.g., a user interface having a display device, a keyboard, and a mouse or other pointing device), but more typically cosmetics identification system 108 is controlled from and accessed by various client systems (e.g., a desktop or a laptop).

Memory 206 of cosmetics identification system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium. In some embodiments, memory 206 or the computer readable storage medium of memory 206 stores the following programs, modules and data structures, or a subset thereof:

Operating System 210 that includes procedures for handling various basic system services and for performing hardware dependent tasks;

Network Communication Module (or instructions) 212 that is used for connecting the cosmetics identification system 108 to other computers (e.g., clients 102) via one or more communications interfaces 204 and one or more communications networks 106 (FIG. 1), such as the Internet, other wide area networks, local area networks, metropolitan area networks, and so on;

Cosmetics Identification Engine 214 that receives cosmetics identification requests from and provides responses to clients 102; and Presentation module 226 that formats results from cosmetics identification engine 214 for display at respective clients; for example, presentation module 226 may generate a web page or XML document that includes information for cosmetic products or an image showing a simulated effect of application of a cosmetic product; in some embodiments, presentation module 226 is executed by front end server 122, which comprises one of the servers implementing cosmetics identification system 108; optionally, presentation module 226 is a module of cosmetics identification engine 214.

In some embodiments, cosmetics identification engine 214 includes the following programs, modules and data structures, or a subset or superset thereof:

Server 112 for managing certain aspects of cosmetics identification system 108 including applications 128, including cosmetics identification application 216 for performing the primary functions of an online cosmetics identification system; cosmetics identification application 216 includes cosmetics identification-client interface program (or module) 218 for receiving cosmetics identification requests from clients and generating responses to the requests, skin identification module 220, and (optionally) image modification module 222; applications 128 may optionally include other applications 224;

User information database 116 that stores records for users;

Cosmetics database 118 that includes concerning various cosmetic products (e.g., name, price, type, and color); and (Optional) Sales database 120 that stores purchase history of users; sales database 120 may include other information (e.g., product availability, lead time, promotions, etc.).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, user information database 116 is part of or stored within server 112. In other embodiments, user information database 116 is implemented using one or more servers whose primary function is to store and process user information. In some embodiments, user information database 116 includes sales database 120, or vice versa. Similarly, an image database (not shown) can be implemented on one or more servers.

The actual number of servers used to implement cosmetics identification system 108 and how features are allocated among them will vary from one implementation to another, and may depend in part on the amount of data traffic that the system must handle during peak usage periods as well as during average usage periods, and may also depend on the amount of data stored by the cosmetics identification system. Moreover, one or more of the blocks in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa.

Figure 3:
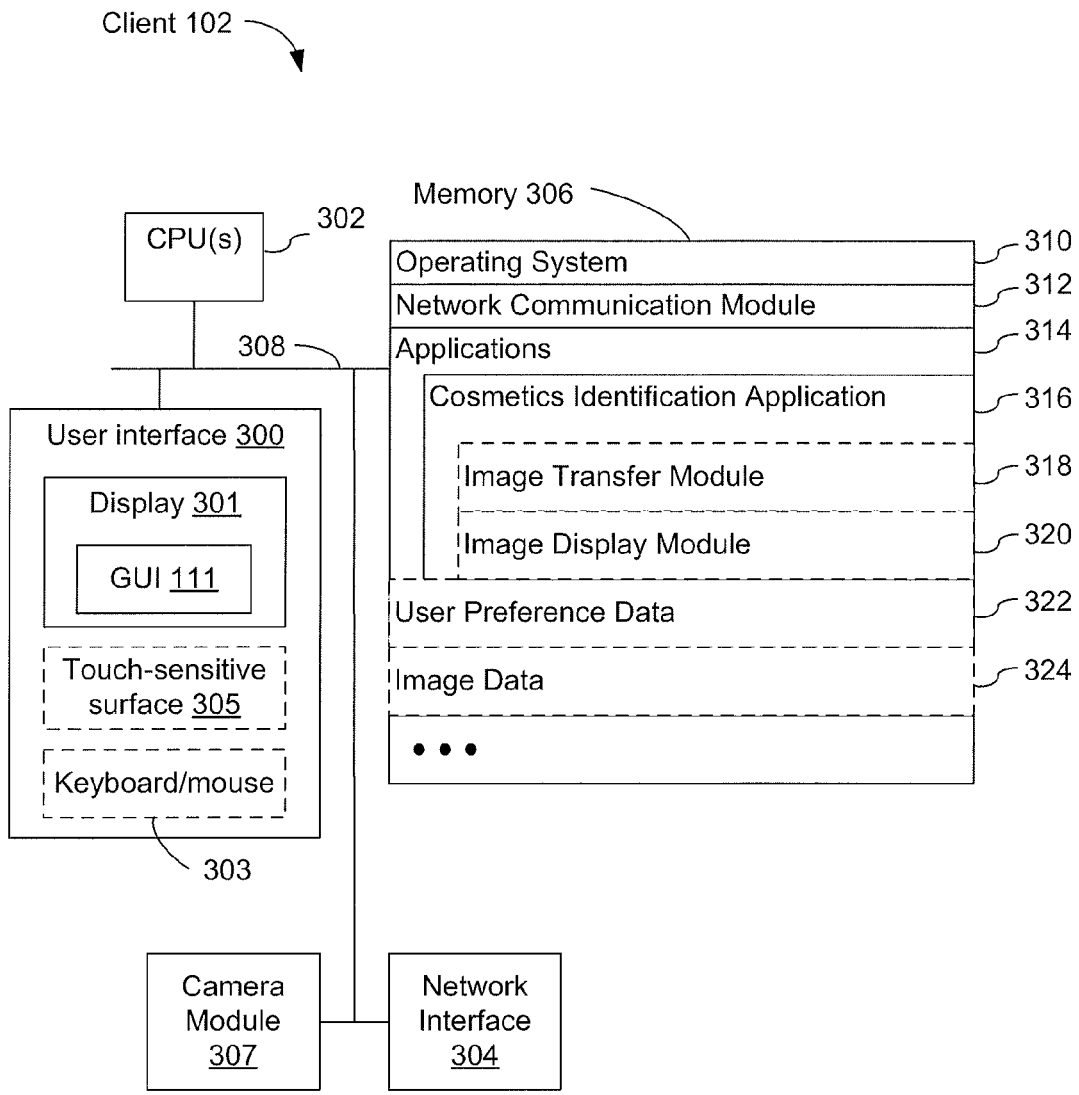
FIG. 3 is a block diagram illustrating a client in accordance with some embodiments.

FIG. 3 is a block diagram illustrating a client, also called client systems or client devices, in accordance with some embodiments. Client 102 as shown in FIG. 3 is configured for use by a user of cosmetics identification system 108. Client 102 includes a user interface 300, which typically includes display device 301, and one or more input devices. In some embodiments, the one or more input devices include touch-sensitive surface 305. In some embodiments, touch-sensitive surface 305 is located on display device 301 (e.g., a touch-sensitive display). In some embodiments, the one or more input devices include a keyboard and a mouse or other pointing device (303). As noted above, client 102 includes graphical user interface (GUI) 111, which is displayed on display device 301. Client 102 typically includes one or more processing units (CPUs) 302, one or more network or other network communications interfaces 304, memory 306, camera module 307, and one or more communication buses 308 for interconnecting these components. In some embodiments, camera module 307 is connected to one or more communication buses through a peripheral module controller (not shown). Communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable storage medium. In some embodiments, memory 306 or the computer readable storage medium of memory 306 stores the following programs, modules and data structures, or a subset thereof:

Operating System 310 that includes procedures for handling various basic system services and for performing hardware dependent tasks;

Network Communication Module (or instructions) 312 that is used for connecting client 102 to other computers (e.g., cosmetics identification system 108 and other clients 102) via the one or more communications network interfaces 304 and one or more communication networks 106 (FIG. 1), such as the Internet, other wide area networks, local area networks, metropolitan area networks, and so on;

Applications 314, including cosmetics identification application 316; in some embodiments, cosmetics identification application 316 includes image transfer module 318 for transferring images to and from cosmetics identification system 108 and/or image display module 320 for displaying one or more images on display device 301;

(optional) User preference data 322, which is a locally stored subset of the user's preferences; and (optional) Image data 324, which is a locally stored subset of the user's images (e.g., images of user's skin).

Figure 4A:
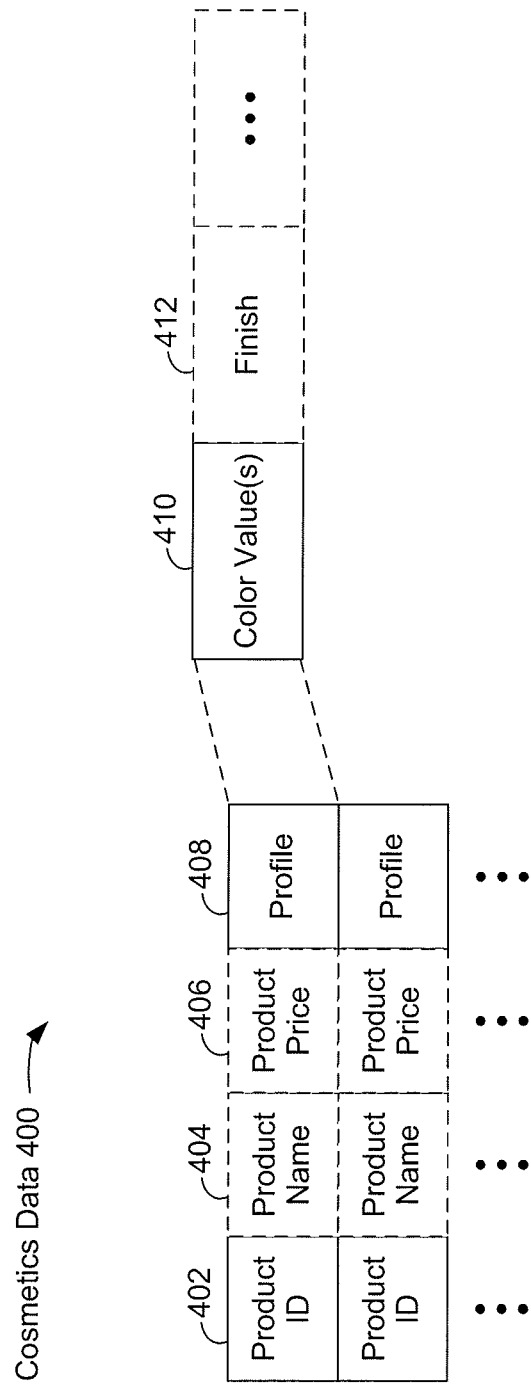
FIG. 4A is a block diagram illustrating an exemplary cosmetics data in accordance with some embodiments.

FIG. 4A is a block diagram illustrating exemplary cosmetics data 400 in accordance with some embodiments. In some embodiments, cosmetics data 400 is stored in cosmetics database 118. Cosmetics data 400 includes information for cosmetic products. Cosmetics data 400 typically includes a plurality of entries, each entry storing information for a respective cosmetic product.

An entry in cosmetics data 400 includes the following data for a cosmetic product, or a subset or superset thereof:

Product ID 402 that uniquely identifies a respective cosmetic product;

(optional) Product Name 404 that identifies a name of the respective cosmetic product;

(optional) Product Price 404 that identifies a price of the respective cosmetic product; and Product Profile 408 that identifies properties of the respective product.

In some embodiments, product profile 408 includes color space values (e.g., chroma and luma values). In some embodiments, product profile 408 includes indication of a finish of the respective product (e.g., semi-matte, natural, or radiant). In some embodiments, product profile 408 includes product performance attributes. In some embodiments, product profile 408 includes product performance claims. In some embodiments, product profile 408 includes product hierarchy (e.g., "hero" or "must-have" status over other products). In some embodiments, product profile 408 includes an area of application (e.g., one or more target facial zones, such as a nose, forehead, and chin).

Figure 4B:
FIG. 4B illustrates a graphical user interface in accordance with some embodiments.

FIG. 4B illustrates a graphical user interface in accordance with some embodiments.

In FIG. 4B, the graphical user interface shows a portion of the digital image. The displayed portion of the digital image includes a first portion of the face of the user. The first portion typically indicates a face without application of a cosmetic product. The graphical user interface shown in FIG. 4B also includes a portion of a modified image. The modified image includes a second portion of the face of the user. The second portion typically includes a face with application of a cosmetic product. In some embodiments, the second portion includes a face with simulated application of the cosmetic product.

Figure 4C:
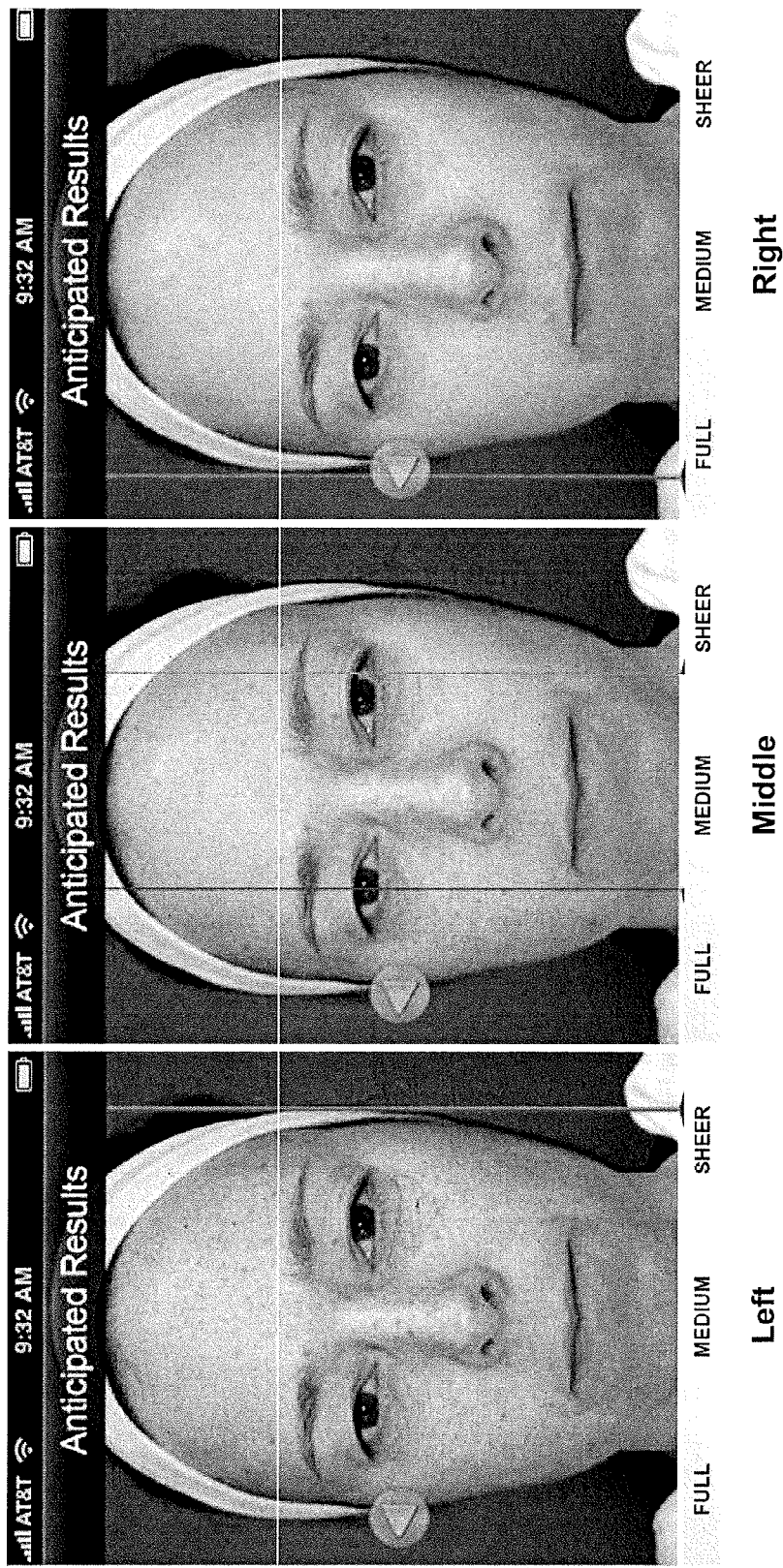
FIG. 4C illustrates graphical user interfaces in accordance with some embodiments.

FIG. 4C illustrates graphical user interfaces in accordance with some embodiments.

Shown on the left side of FIG. 4C is an image of a face of a user. The image shown on the left side of FIG. 4C corresponds to the face of the user without application of a cosmetic product.

The image shown on the left side of FIG. 4C also includes red and green vertical lines. The red and green lines may be moved horizontally based on a user input (e.g., a horizontal drag gesture on a touch-sensitive display). In some embodiments, the red line is used to change a portion of the image that represents a portion of the face without application of a cosmetic product. In some embodiments, the green line is used to change a portion of the image that represents a portion of the face with full application of the cosmetic product.

Shown in the middle of FIG. 4C is an image of the face wherein a first portion of the face is shown without application of the cosmetic product, a second portion of the face is shown with sheer application of the cosmetic product, and a third portion of the face is shown with medium or full application of the cosmetic product. As shown in FIG. 4C, a portion of the face on a left-hand side of the red line is shown without application of the cosmetic product, a portion of the face between the red line and the green line is shown with sheer application of the cosmetic product, and a portion of the face on the right-hand side of the green line is shown with medium or full application of the cosmetic product.

Shown in the right side of FIG. 4C is an image of the face wherein red and green are moved to the left side of the face. The image of the face is shown with simulated medium or full application of the cosmetic product.

Figure 5:
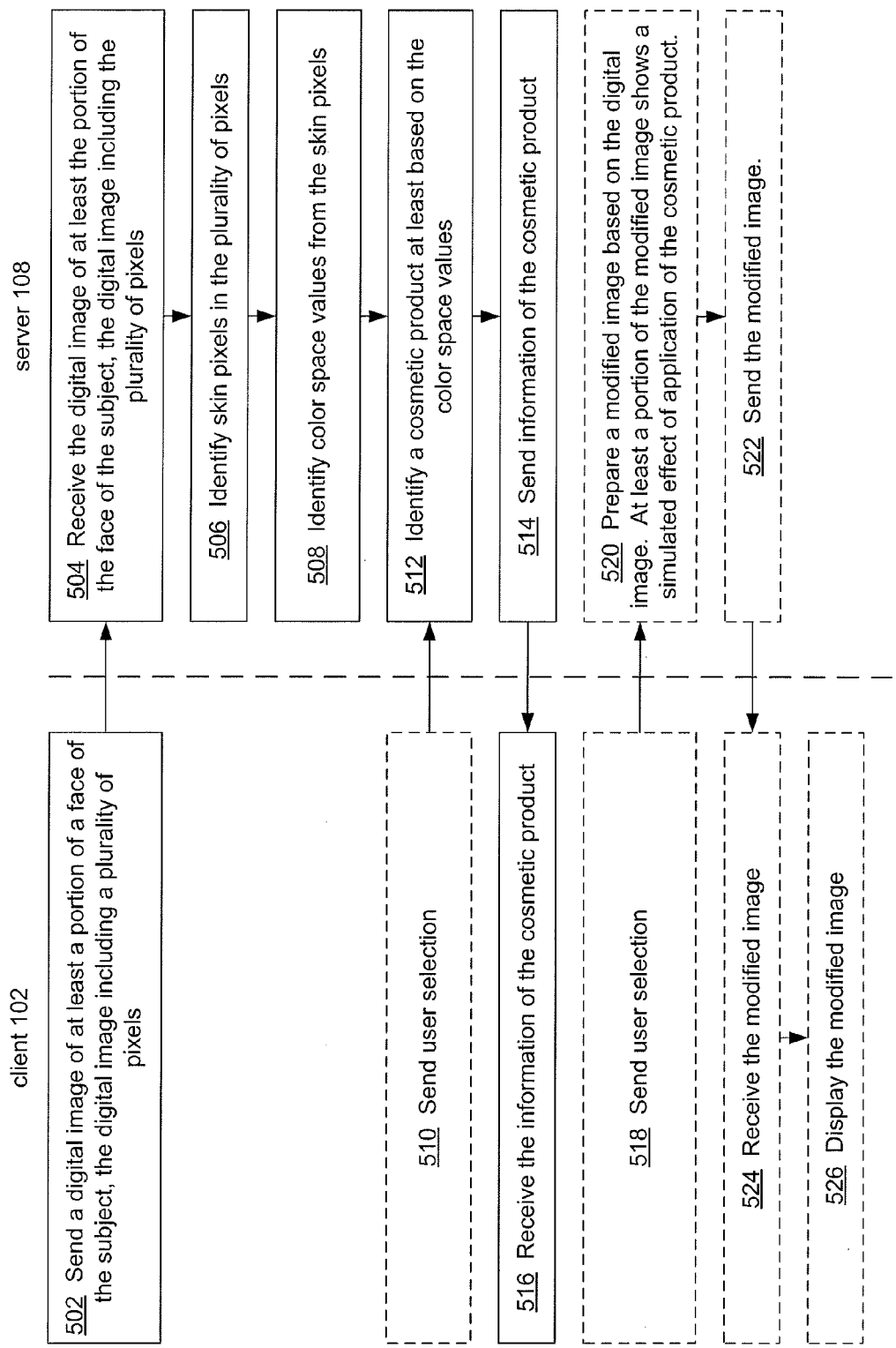
FIG. 5 is a flowchart illustrating operations performed by a client and a server in accordance with some embodiments.

FIG. 5 is a flowchart illustrating operations performed by a client and a server in accordance with some embodiments.

As shown in FIG. 5, client 102 sends (502) a digital image of at least a portion of a face of the subject (e.g., a user) to server 108.

Server 108 receives (504) the digital image of at least the portion of the face of the subject.

Server 108 identifies (506) skin pixels in the digital image. In some embodiments, server 108 performs a facial recognition in the digital image. In some embodiments, performing a facial recognition includes locating non-skin regions (e.g., eyes, nose, mouth, and hair) of the user in the digital image, and precluding the non-skin regions in a face of the user in the digital image. For example, server 108 identifies forehead, cheek, and chin regions of the user in the digital image as skin pixels.

In some embodiments, server 108 identifies a gradient in a brightness of the portion of the face in the digital image, and selects a portion of the face that has a medium brightness (e.g., an average brightness or a median brightness). This precludes regions with reduced lighting or excessive lighting from affecting identifying color space values.

Server 108 identifies (508) color space values from the skin pixels. A respective skin pixel in the digital image typically includes multiple color values, such red (R), green (G), and blue (B) values. In some embodiments, server calculates L, a, and b values (values in a Lab color space, such as a Lab color space specified by the International Commission on Illumination) as color space values. In some embodiments, the L, a, and b values are referred to as Lab values. The methods for converting the RGB values to Lab values are well known. For example, in some embodiments when RGB values range from 0 to 255, Lab values are obtained in accordance with the following equations:

$$r = R/255$$

$$g = G/255$$

$$b = B/255$$

$$r' = \begin{cases} (r+0.055)/1.055)2.4 & \text{(if } r > 0.04045) \\ r/12.92 & \text{(if } r \le 0.04045) \end{cases}$$

$$g' = \begin{cases} (g+0.055)/1.055)2.4 & \text{(if } g > 0.04045) \\ g/12.92 & \text{(if } g \le 0.04045) \end{cases}$$

$$b' = \begin{cases} (b+0.055)/1.055)2.4 & \text{(if } b > 0.04045) \\ b/12.92 & \text{(if } b \le 0.04045) \end{cases}$$

$$r'' = r' \times 100$$

-continued $$g'' = g' \times 100$$

$$b'' = b' \times 100$$

$$x = 0.04124 \times r'' + 0.3576 \times g'' + 0.1805 \times b''$$

$$y = 0.2126 \times r'' + 0.7152 \times g'' + 0.0722 \times b''$$

$$z = 0.0193 \times r'' + 0.1192 \times g'' + 0.9505 \times b''$$

$$x' = \begin{cases} x^{1/3} & \text{(if } x > 0.008856\text{)} \\ 7.787 \times x + 16/116 & \text{(if } x \le 0.008856\text{)} \end{cases}$$

$$y' = \begin{cases} y^{1/3} & \text{(if } y > 0.008856\text{)} \\ 7.787 \times y + 16/116 & \text{(if } y \le 0.008856\text{)} \end{cases}$$

$$z' = \begin{cases} z^{1/3} & \text{(if } z > 0.008856\text{)} \\ 7.787 \times z + 16/116 & \text{(if } z \le 0.008856\text{)} \end{cases}$$

$$L = 116 \times y' - 16$$

$$a = 500 \times (x' - y')$$

$$b = 200 \times (y' - z')$$

Some of these equations assume illumination that corresponds to International Commission on Illumination (CIE) standard illumant D65. However, a person having ordinary skill in the field of colorimetry would understand that different equations can be used to obtain Lab values for different illumination conditions. A person having ordinary skill in the field of colorimetry would also understand that these equations can be presented in more compact forms.

In some embodiments, RGB values of multiple skin pixels are used. This eliminates the effect of imperfections (e.g., spots and/or wrinkles) shown in the digital image from affecting the Lab values of the skin pixels. For examples, average RGB values over a skin region may be used.

In some embodiments, client 102 sends (510) user selection (or user preference) to server 108, and server 108 receives the user selection (or user preference). In some embodiments, the user selection (or the user preference) includes a user preference to use a lighter or darker color.

In some embodiments, prior to client 102 sending user selection, server 108 sends the color space values to client 102, and client 102, in response, presents the color space values to the user. In some embodiments, client 102 presents the color space values in a graphical form to the user (e.g., show the color that corresponds to the color space values concurrently with an image including at least a portion of the face of the subject). Subsequent to presenting the color space values, client 102 receives user selection to use a lighter or darker color, and sends the user selection to server 108.

Server 108 identifies (512) a cosmetic product at least based on the color space values. In some embodiments, server 108 compares the Lab values of the skin pixels to Lab values of cosmetic products. In some embodiments, server 108 retrieves Lab values of cosmetic products from cosmetics database 118 (FIG. 1). In some embodiments, server 108 selects a cosmetic product that has a color that most closely matches the color of the skin pixels. In some embodiments, server 108 identifies a cosmetic product that has a color with a shortest Euclidean distance to a color of the skin pixels. In other embodiments, server 108 selects a cosmetic product that has a color that is close to the color of the skin pixels in accordance with the following equations:

$$\Delta E = \sqrt{(0.5\Delta V_J)^2 + (\Delta W_X)^2 + (0.4\Delta W_Z)^2}$$

$$W_X = \left(\frac{x/x_n}{y/y_n} - 1\right) V_J,$$

where $$W_Z = \left(\frac{z/z_n}{y/y_n} - 1\right) V_J,$$

$x_n$, $y_n$, $z_n$ are chromaticities of a reference white object, and $V_J$ is the Newhall-Nickerson-Judd value function.

In some embodiments, when the user selection is received, server 108 identifies a cosmetic product at least based on the color space values and the user selection.

Server 108 sends (514) information of the identified cosmetic product to client 102.

Client 102 receives (516) the information of the identified cosmetic product. In some embodiments, client 102 presents the information of the identified cosmetic product to the user. For example, client 102 displays an image of the identified cosmetic product.

In some embodiments, client 102 sends user selection for generating a modified image. In some embodiments, the user selection for generating a modified image includes a level of coverage (e.g., sheer coverage, sheer-medium coverage, medium-full coverage, etc.). In some embodiments, the user selection for generating a modified image includes a finish (e.g., semi-matte, natural, radiant, etc.). In some embodiments, server 108 receives the user selection for generating a modified image.

In some embodiments, server 108 prepares (520) a modified image based on the digital image. At least a portion of the modified image shows a simulated effect of application of the cosmetic product. For example, the modified image may include a portion of the face of the subject that does not have a cosmetic product applied and another portion of the face of the subject with a simulated application of the cosmetic product. In some embodiments, the modified image includes three or more portions, each portion corresponding to a respective level of coverage and/or finish. For example, the modified image may include a first portion with a semi-matte finish, a second portion with a natural finish, and a third portion with a radiant finish. In another example, the modified image may include a first portion with a full coverage, a second portion with a medium coverage, and a third portion with a sheer coverage.

In some embodiments, server 108 prepares the modified image by mixing the digital image with a layer with a selected color (called "cosmetic layer" herein). In some embodiments, the selected color is based on the identified color space values. In generating the modified image, the cosmetic layer is applied to the skin pixels. In other words, the cosmetic layer is not applied to eyes, mouth, and hair that do not typically receive application of a particular cosmetic product (e.g., a foundation). This allows eyes, mouth, and hair to look natural in the modified image. In some embodiments, the modified image is prepared by mixing the digital image with the cosmetic layer based on preselected weights. For example, in simulating a sheer application of the cosmetic product, the cosmetic layer is given a low weight (e.g., 10% or 20%) and, in simulating a full application of the cosmetic product, the cosmetic layer is given a high weight (e.g., 60% or 70%). Thus, the modified image is useful in illustrating the product performance as described for a cosmetic product. In some embodiments, the product performance is illustrated by modifying one or more portions of the digital image. For example, for a cosmetic product that is effective in reducing wrinkles in an eye area, the modified image is created by reducing visual features (e.g., wrinkles) in a corresponding area (e.g., eye area).

In some embodiments, server 108 sends (522) the modified image to client 102.

In some embodiments, client 102 receives (524) the modified image and displays (526) the modified image.

In some embodiments, client 102 receives user input manipulating on the modified image, and sends the user input to server 108. For example, the user input may change a portion of the face with a simulated application of the cosmetic product (e.g., increase the portion of the face with a simulated application of the cosmetic product). In another example, the user input may include a change of the level of coverage and/or finish. Server 108, in response, revises the modified image and sends the revised image to client 102. Client 102 replaces the modified image with the revised image.

Details of certain operations shown in FIG. 5 are described below with respect to FIG. 6. Certain details of operations described above with respect to FIG. 5 are applicable to operations shown in FIG. 6 (e.g., identifying skin pixels in the digital image, identifying color space values from the skin pixels, and identifying a cosmetic product). For brevity, these details are not repeated.

Figure 6:
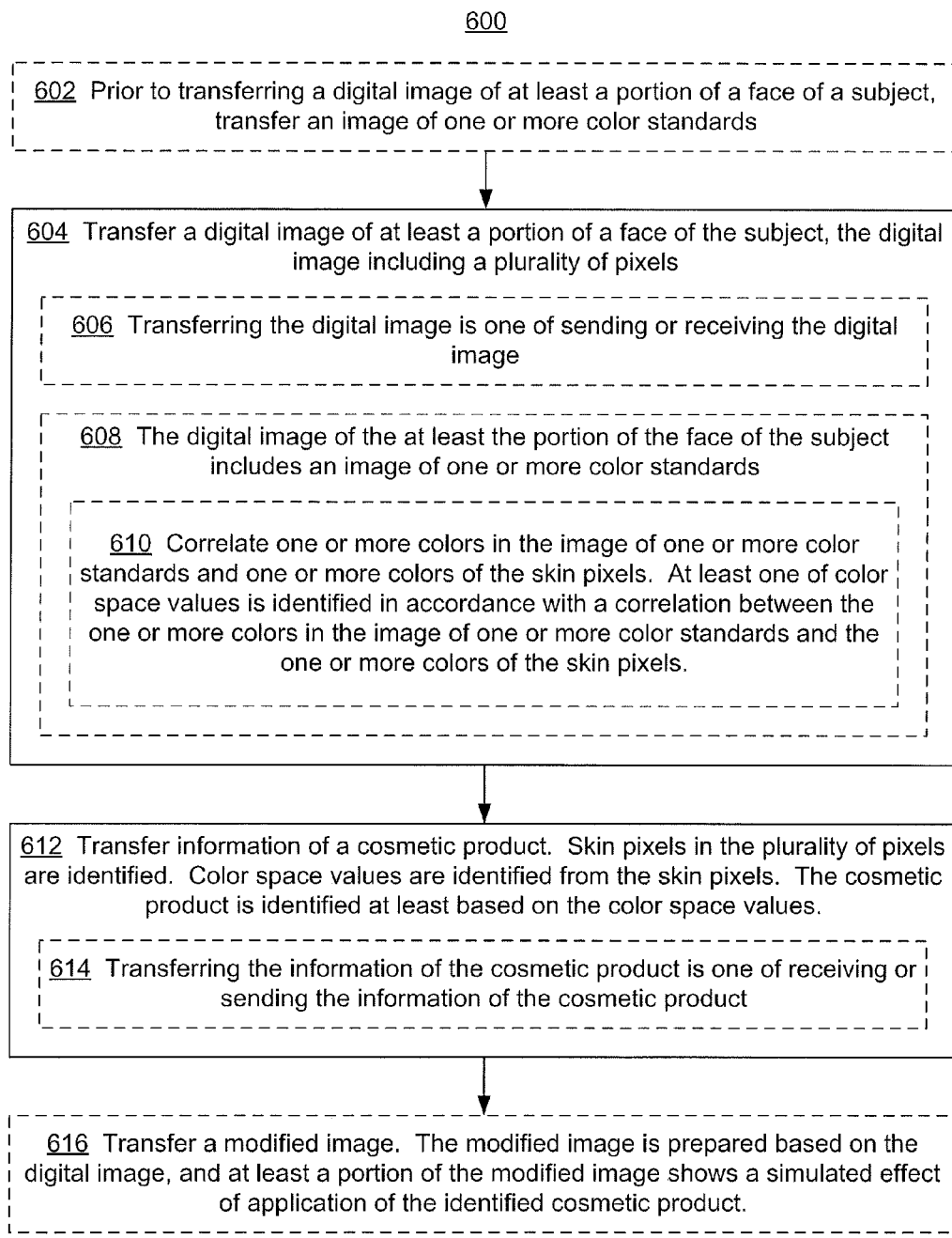
FIG. 6 is a flowchart illustrating a method of identifying a cosmetic product for a user in accordance with some embodiments.

FIG. 6 is a flowchart illustrating method 600 of identifying a cosmetic product for a user in accordance with some embodiments. In some embodiments, the method is performed at a cosmetics identification system (e.g., cosmetics identification system 108 in FIGS. 1 and 2) or a client (e.g., client 102 in FIGS. 1 and 3).

In some embodiments, the system, prior to transferring the digital image of at least the portion of the face of the subject, transfers (602) an image of one or more color standards. In some embodiments, the image of one or more color standards and the digital image of at least a portion of a face of the subject are captured in a same lighting environment. For example, client 102 acquires an image of one or more color standards (e.g., a color wheel, a color standard card that shows multiple standard colors, etc.) and sends the image to server 108. In another example, server 108 receives the image of one or more color standards. Typically, the one or more color standards are one or more preselected color standards.

The system transfers (604) a digital image of at least a portion of a face of the subject (e.g., a user). The digital image including a plurality of pixels. For example, the digital image includes an image of the entire face of the user or a portion thereof, such as a cheek portion of the user.

In some embodiments, the system determines whether the digital image of at least a portion of a face of the subject is suitable for cosmetic recommendations. In some embodiments, the system determines one or more areas in the digital image of at least a portion of a face of the subject for cosmetic recommendations. In some embodiments, the determination is based on a presence of a face and facial characteristics in the digital image. In some embodiments, the determination is based on a presence of facial characteristics in the digital image such that a skin model can be created. In some embodiments, the determination is based on a size of the face in the digital image. In some embodiments, the system corrects an orientation of the digital image. For example, a digital image taken upside down is rotated to have a correct orientation.

In some embodiments, transferring the digital image is (606) one of sending or receiving the digital image. For example, client 102 sends the digital image to server 108. In another example, server 108 receives the digital image.

In some embodiments, the digital image of the at least the portion of the face of the subject includes (608) an image of one or more color standards. For example, the one or more color standards are located adjacent to the portion of the face in the digital image. In some embodiments, this is achieved by placing the one or more color standards below the user's chin when the digital image is acquired.

In some embodiments, the system correlates (610) one or more colors in the image of one or more color standards and one or more colors of the skin pixels. For example, a standard red color in the one or more color standards may not appear as a standard red color in the image. Thus, in some embodiments, the system determines that a color that matches a standard red color as shown in the image has a standard red color. At least one of the color space values is identified in accordance with a correlation between the one or more colors in the image of one or more color standards and the one or more colors of the skin pixels. For example, in some embodiments, colors in the digital image are calibrated based on the image of one or more color standards. In some embodiments, the system processes the image of one or more color standards. For example, the system processes the image of one or more color standards to correlate colors that appear in the image of one or more color standards and one or more colors that the image of one or more color standards represents. In some embodiments, the system processes the image of one or more color standards. In some embodiments, the processing includes a shape recognition (e.g., identifying colors in the image of one or more color standards based on a location of the one or more color standards in the image). For example, a Macbeth color checker chart or any other color checker chart may be used.

In some embodiments, the system performs white balancing on the digital image. In some embodiments, the system receives a user selection of a light source (e.g., outdoor light condition, such as sunny, partly cloudy, and cloudy, or indoor light condition, such as bright white, soft white, and yellow and/or incandescence light or fluorescence light).

The system transfers (612) information of a cosmetic product. Skin pixels in the plurality of pixels are identified. Color space values are identified from the skin pixels. The cosmetic product is identified at least based on the color space values.

In some embodiments, transferring the information of the cosmetic product is (614) one of receiving or sending the information of the cosmetic product.

In some embodiments, the system transfers (616) a modified image. The modified image is prepared based on the digital image, and at least a portion of the modified image shows a simulated effect of application of the cosmetic product.

In some embodiments, the electronic device is selected (618) from a group consisting of a wireless phone, a wireless tablet, and a wireless computer. In some embodiments, the electronic device is a connected device. In some embodiments, the electronic device is a wired device.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A method for analyzing a skin of a subject and identifying a cosmetic product for the subject, comprising:

at an electronic device with one or more processors and memory storing one or more programs for execution by the one or more processors:

calibrating colors of a first digital image, wherein the first digital image depicts at least a portion of a face of the subject, and the first digital image includes a plurality of pixels, and wherein calibrating colors of the first digital image is based on a second digital image of one or more color standards;

transferring the first digital image, but prior to transferring the first digital image, transferring the second digital image of one or more color standards;

using the second digital image of one or more color standards to correlate one or more colors of one or more color standards and one or more colors of the skin pixels, wherein at least one color space value is identified in accordance with a correlation between the one or more colors of one or more color standards and the one or more colors of the skin pixels; and transferring information of a cosmetic product, wherein skin pixels in the plurality of pixels are identified, color space values are identified from the skin pixels, and the cosmetic product is identified at least based on the color space values.

2. The method of claim 1, wherein transferring the first digital image is one of sending or receiving the digital image.

3. The method of claim 1, including:

transferring a modified image, wherein the modified image is prepared based on the first digital image, and at least a portion of the modified image shows a simulated effect of application of the cosmetic product.

4. The method of claims 1, wherein the first digital image further depicts one or more color standards.

5. A method for analyzing a skin of a subject and identifying a cosmetic product for the subject, comprising:

at an electronic device with one or more processors and memory storing one or more programs for execution by the one or more processors:

calibrating colors of a first digital image, wherein the first digital image depicts at least a portion of a face of the subject, and the first digital image includes a plurality of pixels;

displaying the first digital image;

dividing the display of the first digital image into two sides, wherein one side of the first digital image is displayed with no cosmetic product applied, and one side of the first digital image is displayed with a simulated application of a cosmetic product;

transferring the first digital image; and transferring information of a cosmetic product, wherein skin pixels in the plurality of pixels are identified, color space values are identified from the skin pixels, and the cosmetic product is identified at least based on the color space values.

6. An electronic device, comprising:

one or more processors; and memory storing one or more programs for execution by the one or more processors, the one or more programs causing the electronic device to perform a method comprising:

calibrating colors of a first digital image, wherein the first digital image depicts at least a portion of a face of the subject, and the first digital image includes a plurality of pixels;

transferring the first digital image;

displaying the first digital image;

dividing the display of the first digital image into two sides, wherein one side of the first digital image is displayed with no cosmetic product applied, and one side of the first digital image is displayed with a simulated application of a cosmetic product; and transferring information of a cosmetic product, wherein skin pixels in the plurality of pixels are identified, color space values are identified from the skin pixels, and the cosmetic product is identified at least based on the color space values.

7. The method of claim 6, wherein calibrating colors of a first digital image is based on a second digital image of one or more color standards.

8. The electronic device of claim 7, wherein the method includes, prior to transferring the first digital image, transferring the second digital image of one or more color standards.

9. The electronic device of claim 6, wherein the method includes:

transferring a modified image, wherein the modified image is prepared based on the first digital image, and at least a portion of the modified image shows a simulated effect of application of the cosmetic product.

10. The electronic device of claim 6, wherein the first digital image further depicts one or more color standards.

11. A non-transitory computer readable storage medium storing one or more programs for execution by one or more processors of an electronic device, the one or more programs causing the electronic device to perform a method comprising:

calibrating colors of a first digital image, wherein the first digital image depicts at least a portion of a face of the subject, and the first digital image includes a plurality of pixels;

transferring the first digital image;

displaying the first digital image;

dividing the display of the first digital image into two sides, wherein one side of the first digital image is displayed with no cosmetic product applied, and one side of the first digital image is displayed with a simulated application of a cosmetic product; and transferring information of a cosmetic product, wherein skin pixels in the plurality of pixels are identified, color space values are identified from the skin pixels, and the cosmetic product is identified at least based on the color space values.

12. The computer readable storage medium of claim 11, wherein calibrating colors of the first digital image is based on a second digital image of one or more color standards.

13. The computer readable storage medium of claim 11, wherein the method includes:

transferring a modified image, wherein the modified image is prepared based on the first digital image, and at least a portion of the modified image shows a simulated effect of application of the cosmetic product.

14. The computer readable storage medium of claim 11, wherein the method includes, prior to transferring the first digital image, transferring the second digital image of one or more color standards.

15. The computer readable storage medium of claim 11, wherein the first digital image further depicts one or more color standards.

* * * * *